United States Patent [19]

Polzer et al.

[11] 4,184,330

[45] Jan. 22, 1980

[54] HYDRODYNAMIC REVERSING TRANSMISSION

[75] Inventors: Erich Polzer, Heidenheim; Hubert Schmölz, Nattheim, both of Fed. Rep. of Germany

[73] Assignee: Voith Getriebe KG., Heidenheim, Fed. Rep. of Germany

[21] Appl. No.: 937,212

[22] Filed: Aug. 28, 1978

[30] Foreign Application Priority Data

Sep. 12, 1977 [DE] Fed. Rep. of Germany ....... 2740991

[51] Int. Cl.² ............................................. F16D 33/00
[52] U.S. Cl. ........................................ 60/335; 60/357; 60/363; 74/688
[58] Field of Search ................. 60/335, 347, 357, 358, 60/363; 74/688, 732, 733

[56] References Cited

U.S. PATENT DOCUMENTS

| 3,347,113 | 10/1967 | Ramsel ................................ 74/688 |
| 3,566,715 | 3/1971 | Keller et al. ...................... 74/732 X |
| 3,677,004 | 7/1972 | Muller et al. ......................... 60/352 |

FOREIGN PATENT DOCUMENTS

354990 6/1922 Fed. Rep. of Germany.
1580952 10/1972 Fed. Rep. of Germany.

OTHER PUBLICATIONS

Voith-Turbowendegetriebe Transmission Article, Technischer stand, Jan. 1973.

Primary Examiner—Edgar W. Geoghegan
Attorney, Agent, or Firm—Peter K. Kontler

[57] ABSTRACT

A hydrodynamic reversing transmission for earth moving vehicles, forklift trucks or locomotives wherein the degree of filling of each torque converter of the forward drive train is controlled simultaneously with the degree of filling of the corresponding torque converter in the reverse drive train by a reversing valve. The reversing valve has a first operative position in which the filling and draining connections of one converter are respectively connected to the pump and sealed while the filling and draining connections of the other converter are connected to the sump to allow for complete draining of the other converter, a second operative position in which the filling and draining connections of the one converter are connected to the sump for complete draining of the one converter and the filling and draining connections of the other converter are respectively connected to the pump and sealed, and several intermediate positions in each of which the filling connections of both converters are connected with the pump and the draining connections of both converters communicate with the sump. This insures that the converter which is selected to transmit torque to the output shaft of the transmission is partially filled during adjustment of the reversing valve to the corresponding operative position.

20 Claims, 4 Drawing Figures

HYDRODYNAMIC REVERSING TRANSMISSION

BACKGROUND OF THE INVENTION

The present invention relates to hydrodynamic transmissions in general, and more particularly to improvements in hydrodynamic reversing transmissions of the type employing one or more fluid flow power devices in each of the forward and reverse drive trains which connect the rotary input member of the transmission with the rotary output member.

Fluid flow power devices of the type known as torque converters can be made effective by filling them with a suitable working fluid (e.g., oil). The converter becomes ineffective as a result of draining, i.e., on evacuation of working fluid from its interior. Presently known hydrodynamic reversing transmissions comprise a pump or another suitable source of working fluid and a reversing valve which is interposed between the pressure line of the pump and the filling and draining connections of torque converters in the forward and reverse drives. The reversing valve is adjustable between two positions in one of which the filling line of the torque converter in the forward drive train is connected with the pump and the draining line of such torque converter is sealed. In the other position, the reversing valve connects the pump with the filling connection of the torque converter in the reverse drive train and simultaneously seals the draining connection of such torque converter. Transmissions of the just outlined character are often used in vehicles which must change the direction of travel at frequent intervals. Examples of such vehicles are diesel shunting locomotives. An important advantage of a hydrodynamic reversing transmission is that shifting into forward or reverse gear does not entail any wear upon the parts, i.e., the reversing valve merely causes the torque converter in the forward drive train to receive working fluid while the torque converter in the reverse drive train is drained, or vice versa. In fact, it is even possible to effect a changeover while the vehicle is in motion so that one of the drive trains furnishes a braking action.

A drawback of presently known hydrodynamic reversing transmissions (e.g., of the type disclosed in German Auslegeschrift No. 15 80 952) is that the interval which elapses during changeover from forward movement to movement in reverse is relatively long, i.e., the response of the vehicle to the commands of the driver is rather sluggish.

U.S. Pat. No. 3,347,113 granted Oct. 17, 1967 to C. A. Ramsel discloses a transmission which can be used in earth moving vehicles or for analogous purposes. Such vehicles, too, must move back and forth at frequent intervals, e.g., during transfer of earth, rock, ore or like flowable material from the ground onto the platform of a truck, railroad car or the like. The transmission of Ramsel employs a single torque converter coupled to a mechanical gear box which is switched under load. When changing gears, especially during frequent changing of the direction of movement, the wear upon the friction-type switching devices which are used in such transmissions is very pronounced. The same applies when such transmissions are used in forklift trucks and like vehicles.

OBJECTS AND SUMMARY OF THE INVENTION

An object of the invention is to provide a hydrodynamic reversing transmission which is constructed and assembled in such a way that it can respond, with a minimum of delay, to each and every command to change the direction of rotation of its output member.

Another object of the invention is to provide a hydrodynamic reversing transmission wherein the wear upon moving parts during changeover from operation in forward to operation in reverse or vice versa is negligible.

A further object of the invention is to provide a hydrodynamic reversing transmission which can be operated at several speeds during movement in one direction, during movement in the other direction, or during movement in either direction.

An additional object of the invention is to provide novel and improved reversing valve means for use in a transmission of the above outlined character.

Another object of the invention is to provide a hydrodynamic reversing transmission wherein the forward or reverse drive train can supply maximum torque without any or with negligible delay.

An additional object of the invention is to provide a transmission of the above outlined character which can be installed in a variety of conveyances including forklift trucks, earth moving vehicles, locomotives for shunting or switching service and many others.

Another object of the invention is to provide the transmission with novel and improved means for rendering all fluid flow power devices ineffective in dependency on a given parameter.

An ancillary object of the invention is to provide transmission wherein the changeover from idling to movement in forward or reverse direction takes up a short interval of time.

Another object of the invention is to provide a transmission which enhances the safety of the operator when the vehicle embodying the transmission is operated in a quarry or at another location where rapid displacement of the vehicle can save the life of or reduce or eliminate the likelihood of injury to the operator.

The invention resides in the provision of a hydrodynamic transmission which comprises rotary input and output members, forward and reverse drive trains which connect the input member with the output member and respectively comprise first and second fluid flow power devices (hereinafter called torque converters) each of which is adapted to be made selectively effective and ineffective by filling and draining thereof and each of which has a filling connection and a draining connection, a filling pump or another suitable source of working fluid (e.g., oil), and reversing valve means interposed between the source of working fluid and the filling and draining connections of the torque converters. In accordance with a feature of the invention, the reversing valve means is adjustable (e.g., by remote control from the operator's cabin of an earth moving vehicle, a locomotive or the like) between a first operative position in which the filling connections of the first and second torque converters respectively communicate with and are sealed from the source of working fluid and the draining connections of the first and second torque converters are respectively sealed an open, a second operative position in which the filling connections of the first and second torque converters are respectively sealed from and communicate with the source and the draining connections of the first and second torque converters are respectively open and sealed, and a plurality of intermediate positions in which the filling connections of both torque converters communicate with the source and the draining connections are at least partly open (i.e., connected with the sump if the working fluid is oil). This insures rapid filling of the selected torque converter as soon as the reversing valve means assumes its first or second operative position.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a diagrammatic view of a modified hydrodynamic reversing transmission with a different reversing valve and with means for sealing the source of working fluid from the reversing valve during idling.

DESCRIPTION OF THE PREFERRED EMBODIMENTS

Figure 1:
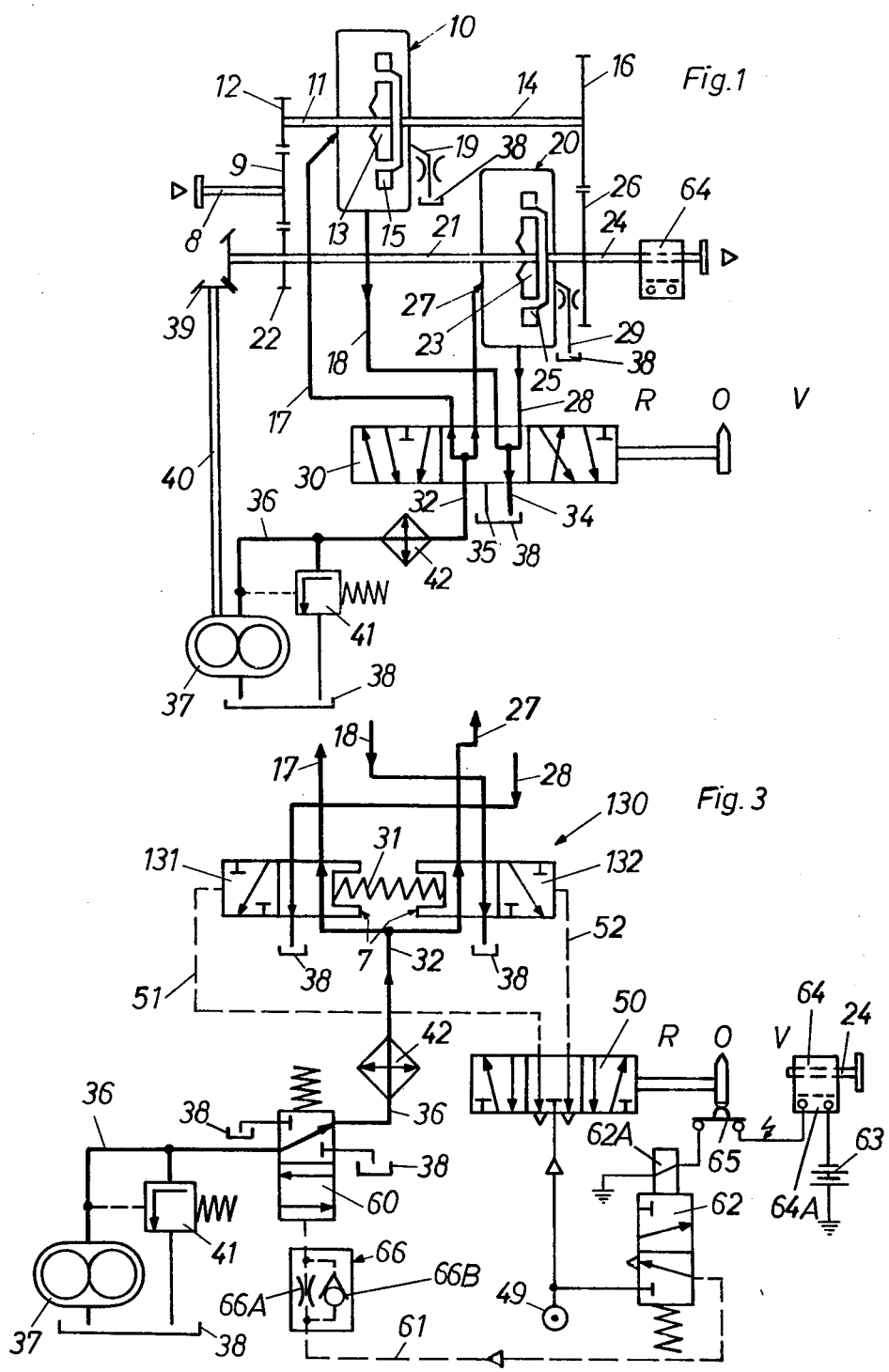
FIG. 1 is a schematic view of a hydrodynamic reversing transmission with two torque converters which embodies one form of the invention.

The transmission of FIG. 1 comprises forward and reverse drive trains with identical torque converters 10 and 20 each of which constitutes a fluid flow power device and which respectively include input shafts 11 and 21, pump impellers 13 and 23, output shafts 14 and 24, and turbine wheels 15 and 25. The input shafts 11 and 21 are respectively driven by gears 12 and 22, and the output shafts 14 and 24 respectively drive gears 16 and 26. The converter 10 receives working fluid by way of a filling connection or line 17 and discharges working fluid by way of a draining connection or line 18. Analogously, the converter 20 receives working fluid by way of a filling connection or line 27 and discharges working fluid by way of a draining connection or line 28. The reference characters 19 and 29 respectively denote outlet ports of the converters 10 and 20; these ports discharge into the oil sump 38.

The gears 12 and 22 mesh with a driver gear 9 on a drive shaft 8 constituting the input member of the transmission and receiving torque from a prime mover (e.g. a diesel engine not shown). It will be noted that the input shafts 11 and 21 (as well as the impellers 13 and 23) always rotate in the same direction. The gear 16 meshes with the gear 26 so that the output shafts 14 and 24 (as well as the wheels 15 and 25) rotate in opposite directions. One of these output shafts (e.g., the shaft 24) is the output member of the transmission.

The filling connections or lines 17, 27 and the draining connections or lines 18, 28 are in communication with the corresponding ports of the housing of a reversing valve 30 which is adjustable (e.g., by hand) between two operative positions "V" and "R" and a centrally located neutral or idling position "O". When the reversing valve 30 is adjusted to assume the operative position "V", the shaft 24 rotates in one direction (forward travel of the vehicle). The shaft 24 rotates in the opposite direction (travel of the vehicle in reverse) when the valve 30 is adjusted to assume the operative position "R". In FIG. 1, the reversing valve 30 is shown in the neutral or idling position "O". The provision of a neutral position "O" for the valve 30 is optional.

The reversing valve 30 has a further port connected with a filling conduit 32 which communicates with a pressure line 36 connected to the outlet of a positive displacement filling pump 37 (e.g., a gear pump) which constitutes a source of pressurized working fluid. The intake of the pump 37 draws working fluid from the oil sump 38 when the pump is driven by the shaft 21 (i.e., by the shaft 8) through the medium of a bevel gering 39 and a pump shaft 40. The reference character 42 denotes a heat exchanger which is installed in the filling conduit 32 to cool the working fluid. A safety valve 41 in the pressure line 36 opens automatically when the pressure in the line 36 exceeds a preselected value to then connect the outlet of the pump 37 with the sump 38. The safety valve 41 opens only in the event of an emergency, i.e., in response to generation of a pressure which exceeds the normal operating pressure range of the working liquid. The reversing valve 30 further comprises two draining connections 34 and 35 for discharge of working fluid into the sump 38.

When the reversing valve 30 is adjusted to assume the ilding or neutral position "O", the filling conduit 32 is connected with the filling lines 17 and 27. The draining lines 18 and 28 communicate with the draining connection 34, i.e., the pressure of working fluid in the lines 18 and 28 equals atomspheric pressure. Consequently, even though the converters 10 and 20 are filled with working fluid up to a certain level, they cannot build up the normal working pressure. The converters operate against each other; however, they use up a small amount of output. If the reversing valve 30 is thereupon adjusted to assume the operative position "V", the filling line 17 of the converter 10 continues to communicate with the filling conduit 32 but the filling line 27 of the converter 20 is connected to the draining connection 35 to allow for evacuation of working fluid into the sump 38. The draining line 28 of the converter 20 continues to communicate with the connection 34, and the draining line 18 of the converter 10 is sealed from the sump 38. Thus, the converter 10 is in the normal operating condition and transmits torque from the input shaft 11 to the output shaft 14. The generation of torque by converter 10 begins practically immediately after adjustment of the valve 30 to operative position "V" because the converter 10 was partly filled with working fluid in the neutral position of the valve. Therefore, the stream of working fluid which is supplied by the pump 37 via pressure line 36 and filling conduit 32 need not be accelerated in response to adjustment of the valve 30 from the position "O" to the position "V" because at least one of the filling lines 17, 27 communicates with the pressure line 36 at all times.

Figure 2:
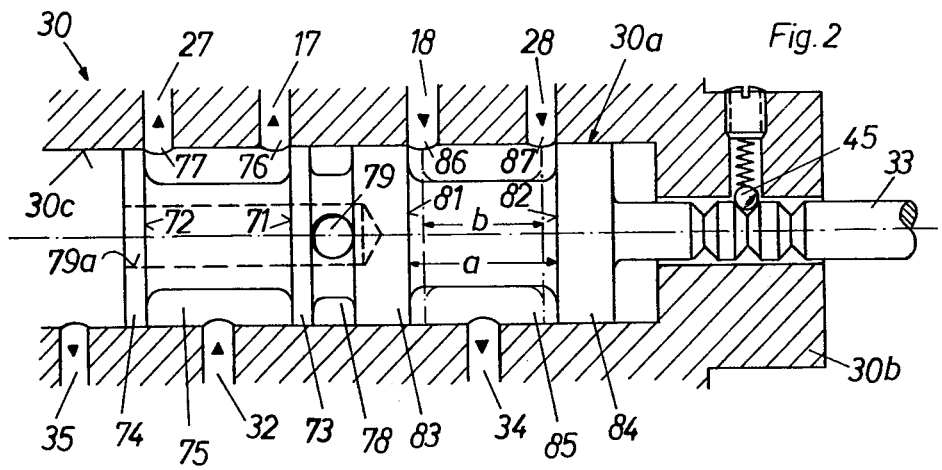
FIG. 2 is an enlarged axial sectional view of the reversing valve in the transmission of FIG. 1.

The construction of the reversing valve 30 is shown in FIG. 2. The valving element 30a of the valve 30 reciprocates in a bore 30c of the valve housing 30b. This valving element is a piston or spool which is connected with a piston rod 33. The latter extends from one end of the housing 30b and cooperates with a spring-biased spherical detent element 45 to yieldably hold the valving element 30a in the selected position corresponding to the position "V", or "R" of the valve 30. As in FIG. 1, the valving element 30a is shown in a position corresponding to the neutral or idling position "O" of the reversing valve 30.

The filling connections or lines 17, 27 and the draining connections or lines 18, 28 can communicate with the bore 30c via ports 76, 77 and 86, 87, respectively. These ports are machined into the valve housing 30b. The bore 30c further communicates with the filling conduit 32 and draining connections 34, 35.

The valving element 30a has four collars or lands 73, 74, 83 and 84 which cooperate with the internal surface of the valve housing 30b to establish or terminate communication between various ports on the one hand and the filling conduit 32 and draining connections 34, 35 on the other hand, depending on the selected axial position of the valving element 30a. The fluid flow control faces of the lands 73, 74, 83, 84 are respectively shown at 71, 72, 81, 82. The reference characters 75, 78 and 85 denote annular grooves which are machined into the peripheral surface of the valving element 30a. The groove 75 extends between the lands 73 and 74, the groove 78 extends between the lands 73 and 83, and the groove 85 extends between the lands 83 and 84.

In the illustrated idling or neutral position of the valve 30, the filling lines 17 and 27 of the corresponding torque converters (not shown in FIG. 2) are in communication with the filling conduit 32 via ports 76, 77 and groove 75. The draining lines 18 and 28 communicate with the draining connection 34 via ports 86, 87 and groove 85. Therefore, and as explained in connection with FIG. 1, the converters 10 and 20 are partially filled or "prefilled" with working fluid. If the valving element 30c is thereupon moved to the left, as viewed in FIG. 2, i.e., to a position corresponding to the operating position "R" of the valve 30, the land 73 seals the port 76 for the filling line 17 from the groove 75 and filling conduit 32. The filling line 17 then communicates with the draining connection 35 via port 76, groove 78, a radial bore 79 of the valving element 30a (between the lands 73 and 83) and an axial blind bore 79a which is machined into the valving element 30 and communicates with the radial bore 79. Thus, the converter 10 is drained. At the same time, the land 84 seals the port 87 for the draining line 28 from the bore 30c of the valve housing 30b, and the filling line 27 continues to communicate with the filling conduit 32 via port 77 and groove 75. Thus, the converter 20 is completely filled while the converter 10 is completely drained.

If the operator decides to move the valving element 30a to the right-hand end position (corresponding to the operative position "V" of the valve 30), the land 74 moves between the port 77 and the filling conduit 32 so that the filling line 27 communicates directly with the draining connection 35 but the port 76 for the filling line 17 continues to communicate with the filling line 32 via groove 75. At the same time, the land 83 seals the port 86 for the draining line 18 from the bore 30c but the draining line 28 continues to communicate with the draining connection 34 via port 87 and groove 85. Thus, the converter 10 is immediately filled with working liquid and the converter 20 is drained.

The positions of the control faces 71, 72, 81 and 82 determine the extent to which the ports 76, 77, 86 and 87 can communicate with the bore 30c, i.e., with the respective grooves in the peripheral surface of the valving element 30a. As shown in FIG. 2, the distance a between the control faces 81, 82 of the lands 83, 84 is selected in such a way that each of the ports 86, 87 is in full communication with the groove 85 (and hence with the draining connection 34) when the valving element 30a is held in the illustrated position. Furthermore, the distance between the control faces 71 and 72 is such that each of the ports 76, 77 is in full communication with the filling conduit 32 via groove 75 as long as the valving element 30a continues to remain in the illustrated position. This insures that the converters 10 and 20 are filled (i.e., prefilled) to a certain level during idling. If it is desired to increase the prefilling level during idling, the valving element 30a is replaced with a valving element wherein the distance between the control faces 81, 82 of the lands 83, 84 is reduced from a to b (this is shown in FIG. 2 by phantom lines).

The distance between the control faces 71, 72 of the lands 73, 74 can be varied within certain limits to thereby change the extent to which the ports 76 and 77 are free to communicate with the bore 30c. In this manner, one can influence the overlapping phase during a change in the direction of travel and the speed at which the transmission reacts in response to movement of the valving element 30a from a position corresponding to the neutral position "O" to a position corresponding to the operative position "V" or "R" of the reversing valve 30.

If the distance a is reduced (e.g., to the distance b or even less), the output requirements of the converters 10 and 20 increase. However, the response time of the selected converter (which is to be filled with working fluid) is reduced accordingly. The idling position of the reversing valve is that position in which the converters 10 and 20 are partially filled to the same extent, i.e., in which the degree to which the draining lines 18, 28 communicate with the sump 38 is the same and the degree to which the filling lines 17, 27 communicate with the pressure line 36 is also the same. Therefore, the sum of torques produced by the converters 10 and 20 is zero (it being assumed that the converters 10, 20 are identical).

As shown in FIG. 2, the filling lines 17, 27 can be in full communication with the filling line 32 in the idling position of the reversing valve 30. However, and as mentioned above, variations are possible here too, for example, to change the responsiveness of the converters during switching in from the idle position of the valve 30 or, in the case of direct changeover from the one to the other operative position, to influence the overlap phase during which each of the converters is partially filled. As a rule, the combined cross-sectional area of those portions of the filling lines 17, 27 which receive working fluid in idling position of the valve 30 is not less than the cross-sectional area of a single filling line (17 or 27). Otherwise, pressure surges could develop in the line 36 or conduit 32, and the speed of fluid flow in the pressure line 36 could be reduced. It involves a minimum of simple experimentation to establish just how far it is possible to reduce the effective cross-sectional areas of the filling lines 17, 27 during idling without risking damage to various connections, lines, conduits and/or component parts (such as 42) which are installed between the pump 37 and the reversing valve 30.

As mentioned above, the reversing valve 30 may but need not be constructed in such a way that it is adjustable to a neutral or idling position. Thus, and referring to FIG. 1, the valve 30 can be designed to have two operative positions "V" and "R" without the aforediscussed idling position "O" therebetween. In such transmissions, the connection between the reversing valve and the pump preferably comprises a short-circuit valve such as the valve 60 of FIG. 3. However, it is presently preferred to employ reversing valves which can be adjusted to assume a central neutral or idling position. This insures that, when the reversing valve is adjusted to assume the position "O", the two converters are partially filled with working liquid, preferably to the same level. Although this means that the two converters require a certain output (such output normally amounts to approximately 40 percent of the maximum output requirements of a single converter), the transmission which embodies such reversing valve exhibits the advantage that the converters are maintained in a state of readiness, i.e., the selected converter responds without any delay or without appreciable delay as soon as the reversing valve is adjusted to assume the corresponding operative position. In other words, the selected converter produces torque as soon as the valving element or elements of the reversing valve are moved to positions corresponding to the selected operative position of the reversing valve.

The valving element or elements of the reversing valve can also be moved to one or more intermediate positions, other than the neutral position, in which one of the converters is filled to a first extent and the other converter is filled to a different second extent. Such procedure can be resorted to when the vehicle which embodies the transmission is to proceed at a crawling pace. There are, of course, many known techniques of reducing the torque which is produced by a hydrodynamic torque converter. One such technique involves partial filling of the converter. An advantage of the aforediscussed feature of filling the torque converters to a different extent is that the torque can be regulated in a simple way and with a high degree of accuracy because the useful torque corresponds to the difference between the torques which are produced by the converters acting against each other.

FIG. 3 illustrates a portion of a modified transmission with the two torque converters (respectively connected to or including the lines 17, 18 and 27, 28) omitted. The reference characters 24, 32, 36, 37, 38, 41 and 42 denote parts which are identical with or analogous to similarly referenced parts of the transmission shown in FIG. 1.

The transmission of FIG. 3 comprises a modified reversing valve 130 which has two reciprocable coaxial valving elements 131 and 132 each of which can be moved between two positions. A biasing means, here shown as a helical compression spring 31, is inserted between the valving elements 131, 132 to urge the valving elements to the "OUT" or "OFF" positions shown in FIG. 3. Such positions correspond to the neutral or idling position of the reversing valve 130. In the illustrated left-hand end position or "OFF" position, the valving element 131 connects the filling line 17 with the filling conduit 32 and the draining line 28 is free to communicate with the oil sump 38. The valving element 132 is held in the right-hand end position or "OFF" position to connect the filling line 27 with the filling conduit 32 and to connect the draining line 18 with the sump 38. Thus, the two torque converters are partly filled with working fluid.

If the valving element 131 is moved to the right-hand end position (the so-called "IN" or "ON" position), its inner end face 7 strikes against the inner end face 7 of the valving element 132 whereby the filling line 17 is connected with the sump 38 and the draining line 28 is sealed. Therefore, the converter 10 is drained and the converter 20 is rapidly filled with working fluid. If the valving element 132 is moved to the left-hand end position (i.e., to the so-called "IN" or "ON" position) so that its end face 7 strikes against the end face 7 of the valving element 131, the draining line 18 is sealed and the filling line 27 is connected with the sump 38. Therefore, the converter 20 is drained and the converter 10 is rapidly filled with working fluid.

The means for moving the valving element 131 or 132 against the opposition of the spring 31 comprises a pneumatic system including a source 49 of compressed gaseous fluid (e.g., air), a servo valve 50 whose valving element is movable between a neutral position "O", a first operative position "V" and a second operative position "R", and two control lines 51 and 52. The control line 51 can admit compressed gaseous fluid against the left-hand end face of the valving element 131 to move the latter to the "ON" position, and the control line 52 can admit compressed gaseous fluid against the right-hand end face of the valving element 132 to move the latter to the "ON" position. When the valving element of the servo valve 50 is moved to the operative position "V", the source 49 is connected with the control line 51 to displace the valving element 131 against the opposition of the spring 31. The valving element 132 is displaced to its left-hand end position or "ON" position in response to movement of the valving element of the servo valve 50 to the operative position "R". The control line 51 is vented when the control line 52 receives pressurized fluid and vice versa. Both control lines are vented in the neutral position "O" of the valving element in the housing of the servo valve 50.

The transmission which embodies the structure of FIG. 3 further comprises a normally open short-circuit valve or second valve 60 installed in the pressure line 36 downstream of the safety valve 41. In the open or inoperative position (shown in FIG. 3), the valve 60 allows pressurized working fluid to flow into the filling conduit 32 via heat exchanger 42. In the other or operative position, the valve 60 connects the pressure line 36 with the oil sump 38. Also, the contents of the filling conduit 32 are returned into the sump. Thus, the short-circuit valve 60 then prevents any flow of working fluid to the converters 10 and 20. The converters are drained out completely so that the vehicle in which the transmission is installed can freewheel without any braking action on the part of the converters.

The short-circuit valve 60 is actuated pneumatically by compressed gaseous fluid which is supplied by the source 49 (or by a discrete source, not shown). Such actuation (i.e., movement of the valving element in the valve 60 from the position shown in FIG. 3 to the other position) is initiated in response to generation of a freewheeling signal transmitted via control line 61 which is connected with the source 49 through the medium of a solenoid-operated valve 62. The valve 62 connects the source 49 with the pressure line 61 in response to energization of its solenoid 62A, namely, in response to closing of an electric switch 65 in the neutral position "O" of the valving element of the valve 50 and at a predetermined speed of the shaft 24. The speed of the shaft 24 is monitored by a tachometer generator 64 (also shown in FIG. 1), which closes a switch 64A when such speed reaches a predetermined value. The switch 64A is in series with the switch 65 and with a source 63 of electrical energy. The switch 64A is closed when the vehicle travels at a certain minimum speed, i.e., in response to reduction of the RPM of the shaft 24 to a predetermined minimum value. The parts 50 and 62 can be said to constitute or form part of an adjusting means which can effect movements of the valving element in the valve 60 between operative and inoperative positions.

It is desirable to delay the diversion of working fluid from the filling conduit 32 into the sump 38 upon closing of the switches 64A and 65. To this end, the pressure line 61 contains a time-delay device here shown as a non-return throttle valve 66 which delays the transmission of pneumatic signal from the source 49 to the short-circuit valve 60 but allows for erasure of such signal without any delay. As shown, the non-return valve 66 has a flow restrictor 66A which delays the buildup of requisite pneumatic pressure at the underside of the valving element of the valve 60 when the valve 62 is open, and a check valve 66B which opens as soon as the pressure in the line 61 upstream of the valve 66 drops, i.e., as soon as the right-hand end of the line 61 is vented via valve 62 in deenergized condition of the solenoid 62A.

The reversing valve 130 can be used with advantage in hydrodynamic transmissions which are installed in vehicles having a source of compressed pneumatic fluid. This is due to the fact that the means for moving the valving elements 131, 132 preferably employs a pneumatic system (plus the compression spring 31 or analogous yieldable biasing means). Pneumatic moving means is preferred owing to its simplicity. However, it is clear that the moving means for the valving elements 131, 132 may include parts which are operated by suction or by pressurized hydraulic fluid or necessitate the provision of a source of electrical energy.

It is already known to adjust a reversing valve which includes a single valving element by resorting to a double-acting pneumatic cylinder and piston unit. The cylinder and piston unit moves the valving element between three positions corresponding to the idle position and the two operative positions of the reversing valve. A drawback of such pneumatically actuated reversing valves is that the cylinder of the double-acting unit has an undesirable dead space in the central position of the piston; this delays its action when the piston is thereupon subjected to the pressure of a gaseous medium. Such drawbacks can be avoided by resorting to the reversing valve 130 of FIG. 3, i.e., to a valve with two reciprocable valving elements. As will be described in connection with FIG. 4, the pneumatic moving means for the valving elements 131, 132 can comprise two single-acting pneumatic cylinders which operate against the action of the compression spring 31 and there is no dead space in the "OFF" positions of the valving elements. Consequently, when the control line 51 or 52 admits compressed gaseous fluid, the valving element 131 or 132 immediately leaves its "OFF" position so that the changeover from operation with the torque converter 10 or 20 takes place practically without any delay or with negligible delay. In other words, the selected torque converter can transmit torque to the shaft 24 practically immediately after the valve 130 is adjusted to assume the one or the other operative position.

The reversing valve 130 also insures that the filling lines 17, 27 communicate with the pump 37 during changeover from the one to the other operative position of the valve 130 without any stoppage in the neutral or idling position, and that the draining lines 18 and 28 remain open during movement of the valving element 131 or 132 from the "OFF" position to the "ON" position. The end faces 7 of the valving elements 131, 132 insure that the valving element 131 cannot assume its "ON" position when the valving element 132 is in the "ON" position, or vice versa. The feature that such simultaneous movement of valving elements 131, 132 to the "ON" positions is prevented by the end faces 7 is but one of several possible solutions of preventing simultaneous sealing of the filling lines 17, 27 from the pump 37. The placing of the end faces 7 at such a distance from each other that they abut each other in the "ON" position of the valving element 131 or 132 invariably prevents simultaneous movement of both valving elements to the "ON" positions. Thus, if one of the elements 131 is to be moved to the "ON" position while the other element dwells in the "ON" position, the one valving element must move the other valving element to the "OFF" position.

An advantage of the short-circuit valve 60 is that it allows for complete draining of both torque converters so that the vehicle which embodies the transmission can run freely. For example, such freewheeling is desirable in shunting locomotives. In the absence of complete draining, the partly filled torque converters would furnish a braking action. Another advantage of the valve 60 is that, when this valve is operative to prevent the flow of working fluid to the reversing valve, the output requirements for the two torque converters are practically zero. As mentioned above, the short-circuit valve 60 is adjusted to assume the operative position only when the reversing valve 130 is adjusted to assume the idling position and the vehicle advances at a certain (minimum) speed. The aforediscussed features prevent movement of the short-circuit valve 60 to its operative position during adjustment of the reversing valve 130 from the one operative position to the other operative position or vice versa, i.e., while the reversing valve assumes the idling position in the course of movement between the two operative positions. Thus, the valve 66 delays the buildup of pneumatic signal which is needed to effect the movement of short-circuit valve 60 to its operative position so that the short interval of dwell of the valve 130 in idling position during movement to the one or the other operative position does not result in closing of the valve 60. On the other hand, the signal to terminate the operation of valve 60 is transmitted without delay due to the provision of check valve 66B. Thus, the valve 60 is returned to the inoperative position immediately after the valve 50 is actuated to effect adjustment of the reversing valve 130 to the one or the other operative position. Such situation will arise when the freewheeling vehicle comes to a halt or the reversing valve is adjusted while the vehicle is in motion.

Figure 4:
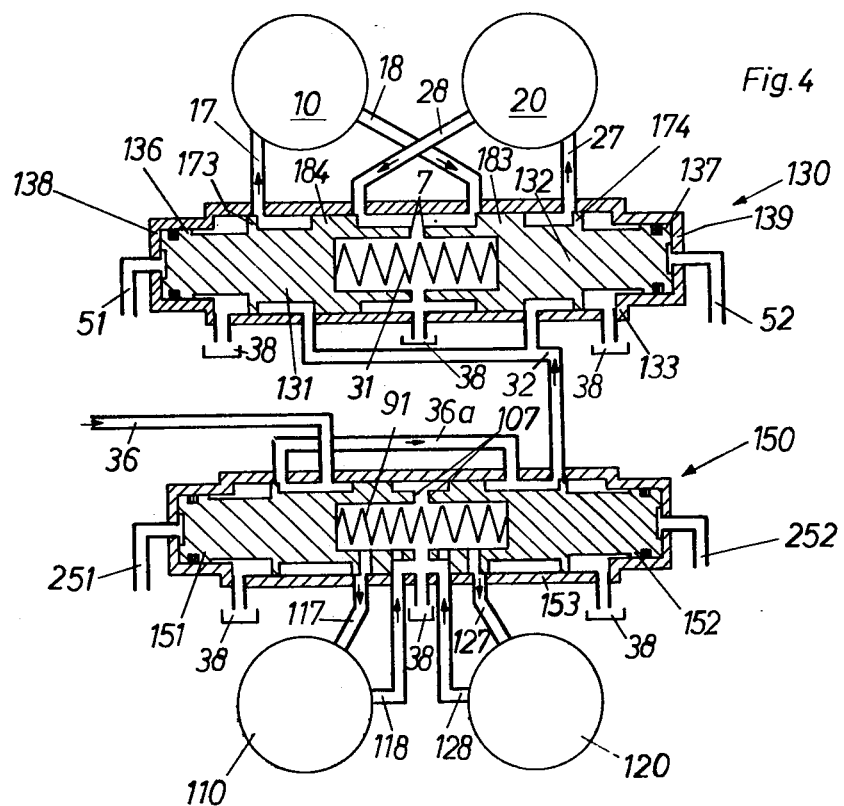
FIG. 4 illustrates a third transmission with four torque converters and two reversing valves.

The upper half of FIG. 4 shows the torque converters 10, 20 and the reversing valve 130 of FIG. 3. The valving elements 131, 132 are reciprocable in the housing 133 of the valve 130. These valving elements are shown in the "OFF" positions, i.e., the spring 31 is free to expand so as to respectively maintain the valving elements 131, 132 in the left-hand and right-hand end positions. The end portions of the valve housing 133 constitute two single-acting cylinders 138, 139 for pistons 136, 137 which are respectively connected to or integral with the valving elements 131 and 132. The cylinders 138, 139 respectively receive compressed gaseous fluid via pressure lines 51, 52 depending on the positon of the valving element in the servo valve 50 which is not shown in FIG. 4. Since the valving elements 131, 132 are shown in "OFF" positions, the control lines 51 and 52 communicate with the atmosphere so that the spring 31 is free to expand. The draining lines 18, 28 of the converters 10 and 20 are connected with the sump 38, and the filling lines 17, 27 communicate with the filling pump (not shown) via conduit 32. The positions of control faces on the collars or lands 173, 174, 183, 184 of the valving elements 131, 132 determine the extent to which the ports for the filling lines 17, 27 and draining lines 18, 28 can communicate with the conduit 32 and sump 38.

When the pressure of gaseous fluid in the control line 51 rises, the valving element 131 moves in a direction to the right and stresses the spring 31. The movement of the valving element 131 is terminated when its end face 7 strikes against the end face 7 of the valving element 132 (the latter continues to dwell in the right-hand end position). The land 184 of the valving element 131 then seals the draining line 28 from the sump 38 and the land 173 allows the filling line 17 to communicate with the sump. Thus, the converter 20 is immediately or rapidly filled with working fluid whereas the converter 10 is drained completely.

By appropriate selection of characteristics of the spring 31 and by regulating the pressure in the control line 51 or 52, it is possible to move the valving element 131 or 132 between two end positons and to a desired number of intermediate positions. This allows for regulation of the extent to which the converter 10 or 20 is filled with working fluid and hence the extent to which the converter 20 or 10 is drained. In other words, by regulating the pressure in the control line 51 or 52, the operator of the vehicle can cause the vehicle to crawl at any one of several speeds below the maximum speed. The crawling speeds can be changed continuously or stepwise, depending on the nature of the servo valve (corresponding to the valve 50 of FIG. 3) which regulates the flow of compressed gas to and from the lines 51 and 52. The speed of the vehicle can also be regulated in a conventional manner, e.g., by adjusting the vanes (not shown) in the converter 10 or 20. The adjustment of pressure in the line 51 or 52 is advisable when the operator of the vehicle desires to reduce the speed below that which can be achieved by adjustment of the vanes, i.e., to a speed which is less than that achieved in response to complete closing of the vanes. Adjustment of vanes is disclosed, for example, in commonly owned U.S. Pat. No. 3,677,004 granted July 18, 1972 to Muller, et al.

If the valving element 131 is held in the right-hand end position (in response to admission of compressed gas into the cylinder 138 via pressure line 51), the valving elements 131, 132 can be moved simultaneously to the other end positions (corresponding to the illustrated position of the valving element 131 and the left-hand end position of the valving element 132) by the simple expedient of moving the valving element of the servo valve 50 of FIG. 3 from the position "V" to the position "R" without any dwell in the neutral position "O". Thus, the valving elements 131, 132 then move as a unit. During such reversing process, the lands of the valving elements 131, 132 insure that, in each intermediate position, the filling conduit 32 communicates with at least one of the filling lines 17 and 27. Also, at least one of the draining lines 18, 28 communicates with the sump 38. In fact, both filling lines 17, 27 are connected with the conduit 32 and both draining lines 18, 28 are in communication with the sump 38, at least during the major part of simultaneous movement of both valving elements 131, 132 in the housing 133.

A second reversing valve 150 (shown in the lower half of FIG. 4) serves to connect the pressure line 36 with two additional torque converters 110, 120 which are respectively installed in the forward and reverse drive trains and constitute cruising converters. Thus, the transmission of FIG. 4 comprises two torque converters (10, 110 and 20, 120) for each directon of travel of the vehicle. The converters 10, 20 constitute starting converters for forward and reverse movement, and (as mentioned above) the converters 110, 120 respectively constitute cruising converters for forward and reverse movement.

The construction of the reversing valve 150 is similar to that of the valve 130. The valve 150 enables working fluid to rapidly fill the cruising converter 110 or 120. Furthermore, and as in the case of the starting converters 10, 20, the valve 150 allows for rapid switching from one cruising converter to the other cruising converter for the purpose of hydrodynamic braking. In the illustrated position of the valve 150, in which its valving elements 151, 152 are held in the outer end positions because the spring 91 is free to expand and the pressure in the control lines 251, 252 equals atmospheric pressure, the cruising converters 110 and 120 are completely drained. The pressure line 36 communicates with the filling conduit 32 via intermediate conduit 36a. The line 36 receives pressurized working fluid from a pump, not shown in FIG. 4. The operator can cause the valve 130 to fill one of the starting converters 10, 20 or to maintain the valving elements 131, 132 in the illustrated positions (idling).

When the means for moving the valving elements 151, 152 in the housing 153 is actuated in such a way (admission of compressed gas via control line 251) that the element 151 is moved from the illustrated "OFF" position to the "ON" position, the end face 107 of the displaced element 151 strikes against the end face 107 of the other element 152. The compression spring 91 is then fully confined in the recesses of the two end faces 107. The converter 110 is filled because the filling connection or line 117 commuicates with the pressure line 36 (i.e., with the source of working fluid) and its draining connection or line 118 is sealed from the sump 38 when the valving element 151 is moved to the "ON" position while the element 152 continues to dwell in the illustrated "OFF" position. Analogously, the converter 120 is filled because its filling connection or line 127 communicates with the pressure line 36 and its draining connection or line 128 is sealed from the sump 38 when the valving element 152 is moved to the "ON" position (by compressed gas in the control line 252) while the element 151 remains in the illustrated ("OFF") position. The draining line 128 communicates with the sump 38 when the valving element 151 is moved to the "ON" position, and the draining line 118 continues to communicate with the sump when the valving element 152 is moved to the "ON" position. One of the filling lines 117, 127 communicates with the pressure line 36 whenever the valving element 151 and/or 152 is moved from the "OFF" position. The filling conduit 32 is sealed from the pressure line 36 shortly after the valving element 151 or 152 leaves the illustrated "OFF" position. When the element is displaced, one of its lands seals the conduit 32 from the connecting line 36a. When the element 151 is displaced, one of its lands seals the pressure line 36 from the connecting line 36a and connects the latter with the sump 38.

The draining lines 118 and 128 are never sealed from the sump 38 at the same time. In fact, these draining lines communicate with the sump at all times except when the valving element 151 or 152 assumes its "ON" position. The line 118 is sealed from the sump in the "ON" position of the element 151, and the line 128 is sealed from the sump in the "ON" position of the element 152.

The improved transmission can be used in bulldozers or other types of earth moving vehicles, in locomotives, in forklift trucks and in similar conveyances which must move back and forth, often at frequent intervals. In many instances, such vehicles must move back and forth between two points which are only a few meters apart, i.e., the driver must actuate the reversing valve at rapidly following intervals, e.g., at intervals of five seconds or even less. When the vehicle which embodies the improved transmission is used in a quarry or in an underground excavation, it should be capable of moving out of the way at a high speed (e.g., in the event of sudden cave-in of material) in order to save the life of the operator and to avoid damage to the vehicle.

These and other advantages of the transmission are attributable to the fact that the reversing valve or valves permit the filling connections to communicate with the pump and maintain the draining connections in partial or full communication with the sump during adjustment of the respective reversing valve between the two operative positions (i.e., the position in which one of the torque converters which is controlled thereby is completely filled and the other is completely drained, and the position in which the other torque converter is filled and the one torque converter is completely drained). In other words. The working fluid continues to flow into both converters in each intermediate position of the respective reversing valve. This is in contrast to the operation of presently known hydrodynamic reversing gears wherein the flow of working fluid into a selected torque converter can take place only in the corresponding operative position of the reversing valve. Each interruption of flow of working fluid to a converter involves a delay in filling. The fact that one of the converters is completely drained when the other converter drives the output element is of no consequence because filling of the drained converter can begin as soon as the reversing valve leaves the respective operative position, i.e., during movement of the valving element or elements of the reversing valve to positions corresponding to other operative position of the reversing valve.

Another important advantage of the improved transmission is that pressure surges (if any) of working fluid in various connections, lines and conduits during changeover from operation in forward to operation in reverse or vice versa are negligible. This reduces the likelihood of damage to the conduits, lines and connections as well as to the heat exchanger(s). Furthermore, the improved transmission permits movement of the valving element or elements of the reversing valve at any desired speed, i.e., the changeover from one operative position to the other operative position of the reversing valve can be effected gradually, rapidly or abruptly without any danger of damage to component parts of the transmission.

The construction of each reversing valve in such a way that the draining connections of the corresponding torque converters are open, at least in part, during the major part of or during the entire period of changeover from one operative position to the other operative position of the reversing valve is desirable and advantageous because this insures that simultaneous filling of both converters during changeover is of no consequence. Partial or complete opening of both draining connections during changeover insures that, even though the converters operate against each other, such operation against each other does not take place at the maximum output level. Were the converters which are controlled by one and the same reversing valve permitted to operate against each other at the maximum output level, the total output requirements would be increased accordingly and the converter which is about to be drained would retard the converter which is in the process of being filled, i.e., the selected converter would be incapable of transmitting maximum torque with a minimum of delay following a changeover from operation in reverse to operation in forward direction or vice versa.

Rapid response of the selected torque converter to a changeover of reversing valve from the one to the other operative position is attributable to three factors. First, the stream of working fluid which is supplied by the pump continues to flow during changeover and the working fluid is diverted from one filling connection to the other filling connection in the interior of the valve housing. Secondly, the changeover can take place rapidly, even abruptly. Furthermore, the converter which is in the process of being filled is not retarded by the other converter.

The aforediscussed and other advantages of the improved transmission will be readily understood from the following comparison with the performance and mode of operation of two presently known reversing transmissions. One of the known transmissions employs a reversing valve which, when adjusted to assume the neutral position, opens the draining connections of both converters but seals the filling connections of both converters. The filling pump is a positive displacement pump. Thus, when the reversing valve is adjusted from one operative position to the other operative position, the flow of working fluid from the positive displacement pump is obstructed at the corresponding port or ports of the reversing valve when the reversing valve assumes the neutral (central) position. Therefore, the pressure in the line between the outlet of the pump and the reversing valve rises and a relief valve opens to admit the conveyed working fluid into the sump. When the obstruction at the port or ports of the reversing valve is terminated (as a result of adjustment of the reversing valve beyond the neutral position), the fluid which is supplied by the pump must be accelerated as soon as the corresponding port or ports are free to admit fluid into the housing of the reversing valve. In addition, surges in pressure of working fluid upstream of the reversing valve endanger the conduits and are likely to cause damage to component parts in the pressure line, particularly to the heat exchanger(s). Therefore, such types of transmissions must be equipped with means for preventing abrupt shifting of the valving element(s) in the housing of the reversing valve. This causes the aforediscussed sluggish response of the just described conventional transmission to changeover in the position of the reversing valve.

Another known transmission (of the type disclosed in German Pat. No. 354,990) employs one or more reversing valves which operate in such a way that each changeover entails sealing of both draining lines from the sump but the filling connections continue to communicate with the pump outlet. This causes the non-selected converter to operate counter to operation of the selected converter at full converter pressure. Therefore, the output requirements of such transmissions are doubled. Operation of one converter counter to operation of the other converter during changeover in the position of the reversing valve or valves is intentional in order to avoid racing of the prime mover which drives the input member of the transmission. In fact, provision is made to retard the reversing or switchover operation by resorting to a braking piston which is coupled to the valving element of the reversing valve. Thus, the patented transmission cannot insure rapid transition from operation in forward to operation in reverse or vice versa.

Experiments which were carried out with the improved transmission indicate that, in comparison with conventional transmission, the response time (i.e., the interval which elapses between a switching command and the start of transmission of torque to the output member) can be reduced by at least 50 percent. The response time can be shortened still further by resorting to certain auxiliary measures, e.g., by increasing the specific output of the filling pump.

It has been found that the response time of the improved transmission is just as short as or even shorter than that of hydrodynamic-mechanical transmissions (see the aforementioned U.S. Pat. No. 3,347,113) which are presently used in earth moving vehicles. In such conventional transmissions, reversal of the direction of travel is effected by changing the positions of elements in the mechanical gear box. A reduction in response time of a hydrodynamic-mechanical transmission invariably entails an increase of intensity of the switching jolt which causes pronounced wear upon the gears of the mechanical unit.

If the filling pump 37 is a positive displacement pump, the improved transmission can dispense with the afore-discussed relief valve which is necessary in conventional hydrodynamic transmissions. Thus, all that is necessary or advisable is to provide a safety valve which opens in response to a rise of the pressure of working fluid to a predetermined value, i.e., which responds only in the case of an emergency such as the blocking of a heat exchanger or filter.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A hydrodynamic transmission, comprising rotary input and output members; forward and reverse drive trains connecting said members and respectively comprising first and second fluid flow power devices each adapted to be made selectively effective and ineffective by filling and draining thereof and each having a filling connection and a draining connection; a source of working fluid; and reversing valve means interposed between said source and said connections and adjustable between a first position in which the filling connections of said first and second devices respectively communicate with and are sealed from said source and the draining connections of said first and second devices are respectively sealed and open, a second position in which the filling connections of said first and second devices are respectively sealed from and communicate with said source and the draining connections of said first and second devices are respectively open and sealed, and a plurality of intermediate positions in which said filling connections communicate with said source and said draining connections are at least partly open.

2. The transmission of claim 1, wherein said valve means comprises a housing having ports communicating with said connections, said intermediate positions of said valve means including and idling position in which at least a portion of each port for said filling connections communicates with said source and at least a portion of each port for said draining connections permits evacuation of fluid from the respective device via said housing.

3. The transmission of claim 1, wherein said valve means comprises a housing, first and second valving elements movably installed in said housing, and means for moving each of said valving elements between an "ON" position and an "OFF" position, said valve means assuming said first position when said first and second elements are respectively moved to said "ON" and "OFF" positions, said valve means assuming said second position when said first and second elements are respectively moved to said "OFF" and "ON" positions, and said valve means assuming one of said intermediate positions when each of said elements is moved to the "OFF" position.

4. The transmission of claim 3, wherein said first and second elements respectively establish communication between the filling connections of said second and first devices and permit evacuation of fluid via draining connections of said first and second devices in said "OFF" positions thereof, and seal the filling connections of said second and first devices from said source and seal the draining connections of said first and second devices in said "ON" positions thereof.

5. The transmission of claim 3, wherein said valving elements are substantially coaxial and are reciprocable in said housing, said moving means comprising means for yieldably biasing said elements away from each other and to said "OFF" positions.

6. The transmission of claim 5, wherein said biasing means comprises a compression spring disposed between said elements.

7. The transmission of claim 5, wherein said elements have end faces which abut against each other in the "ON" position of each of said elements.

8. The transmission of claim 1, wherein said intermediate positions include at least one position in which said devices are partially filled but to a different extent.

9. The transmission of claim 1, further comprising second valve means interposed between said reversing valve means and said source and means for adjusting said second valve means between operative and inoperative positions in which said second valve means respectively seals said source from said reversing valve means and permits working fluid to flow from said source to said reversing valve means.

10. The transmission of claim 9, wherein said adjusting means includes means for moving said second valve means to said operative position in response to movement of said reversing valve means to one of said intermediate positions.

11. The transmission of claim 10, wherein said adjusting means further comprises means for monitoring the speed of said output member and means for actuating said moving means within a predetermined speed range of said output member.

12. The transmission of claim 11, wherein said speed range embraces the minimum speed of said output member.

13. The transmission of claim 10, further comprising means for delaying the movement of said second valve means to said operative position on movement of said reversing valve means to said one intermediate position.

14. The transmission of claim 1, wherein said forward and reverse power trains respectively further comprise third and fourth fluid flow power devices each having a filling connection and a draining connection, and further comprising second reversing valve means interposed between said source on the one hand and said first mentioned valve means and the filling and draining connections of said third and fourth device on the other hand, said second valve means being adjustable between a first position in which the filling connections of said third and fourth devices respectively communicate with and are sealed from said source and the draining connections of said third and fourth devices are respectively sealed and open, a second position in which the filling connections of said third and fourth devices are respectively sealed from and communicate with said source and the draining connections of said third and fourth devices are respectively open and sealed, and an idling position in which the filling connections of said third and fourth devices communicate with said source and the draining connections of said third and fourth devices are open, said second valve means being arranged to seal said source from said first mentioned valve means in said first and second positions of said second valve means and to admit working fluid from said source to said first mentioned valve means in said idling position.

15. The transmission of claim 14, wherein said first and second devices are starting torque converters and said third and fourth devices are cruising torque converters.

16. The transmission of claim 14, wherein said second valve means has a plurality of intermediate positions in each of which the filling connections of said third and fourth devices are in at least partial communication with said source and the draining connections of said third and fourth devices are at least partially open, said idling position constituting one of said last mentioned intermediate positions.

17. The transmission of claim 14, wherein said second valve means comprises a valve housing, first and second valving elements movably installed in said housing, and means for moving each of said valving elements between an "ON" position and an "OFF" position, said second valve means assuming said first position when said first and second elements are respectively moved to said "ON" and "OFF" positions, said second valve means assuming said second position when said first and second elements are respectively moved to said "OFF" and "ON" positions, and said second valve means assuming said idling position when each of said elements is moved to the "OFF" position.

18. The transmission of claim 17, wherein said valving elements are substantially coaxial and are reciprocable in said housing, said moving means including means for yieldably biasing said elements to said "OFF" positions.

19. The transmission of claim 18, wherein said biasing means comprises a compression spring installed between said elements and arranged to urge said elements away from each other.

20. The transmission of claim 18, wherein said elements have end faces which abut against each other in said first and second positions of said second valve means.

* * * * *